United States Patent Office 3,109,258
Patented Nov. 5, 1963

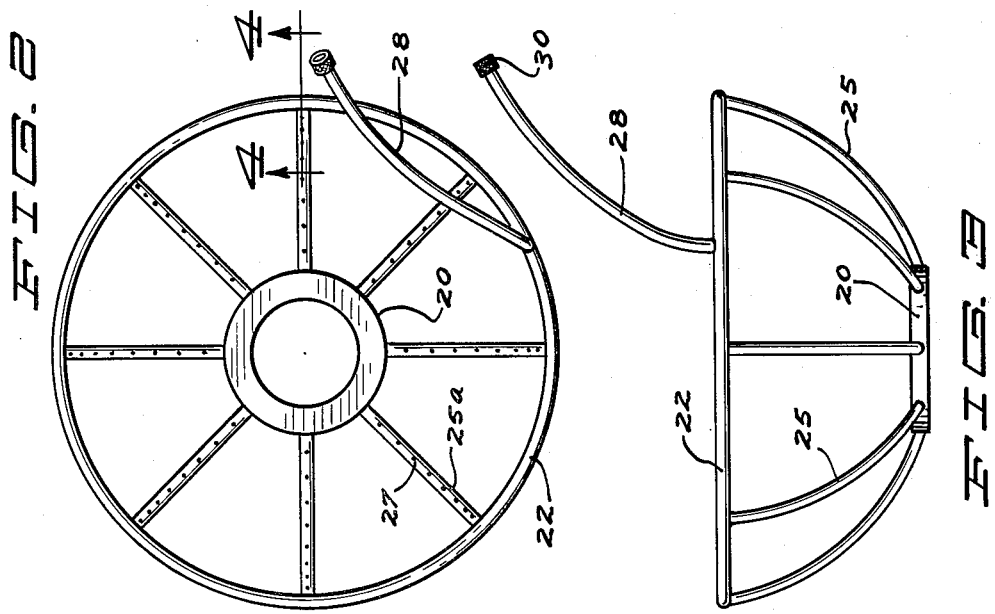
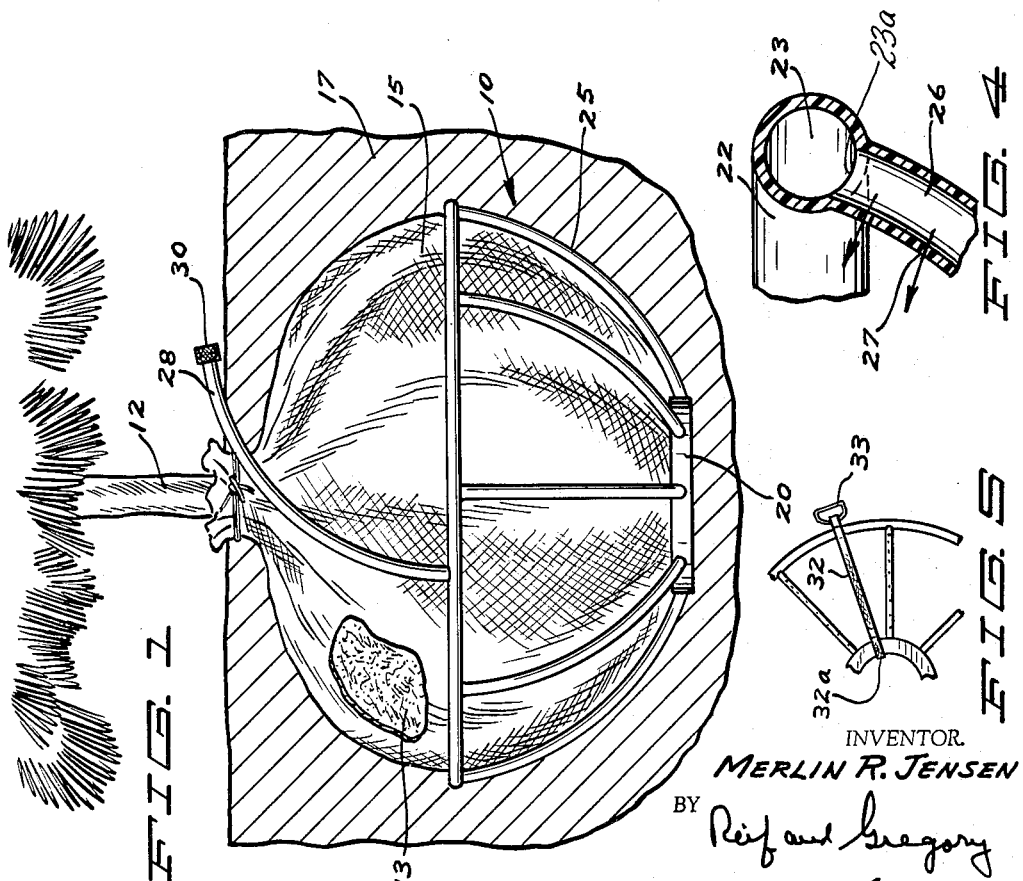

3,109,258
ROOT WATERING DEVICE
Merlin R. Jensen, 1935 Gerard Ave. S.,
Minneapolis 5, Minn.
Filed Mar. 23, 1962, Ser. No. 181,980
4 Claims. (Cl. 47—48.5)

This invention relates to an improvement in a root watering device for plants having substantial root development, with particular reference being had for purpose of illustration to such a plant as a tree. Applicant's device represents a substantial improvement in a root watering device in serving both to hold together the earth compacted about the root portion of the plant and in serving as a permanent installation for receiving water to be fed to the plant and concentrating the water about the root portion of the plant.

It is an object of this invention therefore to provide a permanent underground watering device for a plant.

It is a further object of this invention to provide a watering device to form a retainer for the earth about the root portion of a plant.

It is another object of this invention to provide a watering device adapted to serve to retain a ball of earth about the root portion of the plant and to serve as a cradle for handling the plant in planting the same.

It is also an object for this invention to provide an underground watering device for a plant for individually watering the root portion of the plant and which may be connected to a central water supply.

These and other objects and advantages of the invention will be fully set forth in the following description made in connection with the accompanying drawings in which like reference characters refer to similar parts throughout the several views and in which:

FIG. 1 is a broken view in section showing applicant's device in operating position;

FIG. 2 is a top plan view of applicant's device;

FIG. 3 is a view of applicant's device in side elevation;

FIG. 4 is a broken view in horizontal section taken on line 4—4 of FIG. 2 as indicated by the arrows; and FIG. 5 is a fragmentary portion of applicant's device on a reduced scale showing a modification in connection therewith.

With reference to the drawing, applicant's device 10 is shown in operating position in connection with a plant 12 here indicated as representing a tree. The root portion 13 of said plant is shown in a balled condition, or in other words having earth compacted thereabout and being enveloped in a layer of burlap 15. This is the usual condition of a tree in readiness for planting. Said root portion is shown in planted condition in the earth 17. With the passage of time the burlap will disintegrate completely.

Applicant's device may take on various specific forms and be made up of variously formed specific portions. Said device is here shown in a preferred embodiment.

Applicant's device 10 is illustrated taking on a substantially semi-spherical form comprising a base portion 20 shown as an annulus in the form of a solid annular ring indicated as being rectangular in vertical cross section.

Concentric with said base portion is an annulus in the form of a tubular ring 22 of relatively larger diameter than said base portion and spaced axially therefrom. It is quite obvious that applicant's device may be made in various overall sizes to accommodate different sized balled root portions of plants. Said tubular ring has a passage 23 therein.

Connecting said ring 22 and said base portion 20 are a plurality of elongated tubular members 25 disposed in planes at right angles to the planes of said tubular ring 22 and the base portion 20 in operating position and being respectively secured thereto by any suitable means, such as by the use of an adhesive or by adhesion through the application of heat to form a unitary construction. Said tubular members 25 respectively form passages 26 running therethrough with a passage 23a extending between the passage 23 and each of said passages 26 for free communication between said passages 26 in said tubular members 25 and the passage in said tubular ring 22.

On the inner side 25a of each of said elongated tubular members are longitudinally spaced apertures 27.

Applicant's device is preferably formed of a material which is sufficiently flexible to accommodate itself to variations in ball forms and to be readily collapsible for packing purposes. Further said device will be formed of a material which will have an indefinite underground life for use period and in addition will have substantial tensile strength and be able to withstand rugged use, such as being used as a sling or cradle as a holding member for lowering the plant into its planting hole in the earth. Various types of readily available plastic materials have been found to be very suitable for the requirements of applicant's device.

Connected to said annular ring 22 to be integral therewith and for communication with the passage therein is a tubular supply conduit 28 which will extend to the surface of the ground and is here shown having a terminal fitting 30.

Said supply conduit may be connected by a hose to a supply of water, or a number of these devices 10 may be connected in series to a common water supply in forming a watering system. Applicant's device may be individually supplied as with a watering can handled by an operator. The inventive concept embracing applicant's device embodies these various obvious ways in providing water or liquid feeding material for the plants involved. It is not believed that any specific illustration or further explanation should be required for anyone familiar with the art.

Operation

In FIG. 1 of the drawing, a tree is shown in planting condition having earth balled about the root portion of the tree and enveloped in a layer of burlap. Applicant's device 10 is shown retaining the lower half of the root portion. Applicant's device may be used as a sling or cradle in receiving the root portion of the plant for lowering the plant into its planting hole or the device may be first positioned in the bottom of the planting hole and the plant lowered thereinto. With many plants of a size which may be readily handled by hand, the earth may be compacted about the root portion of the plant and applicant's device may serve as a retainer for the earth and also as a sling or cradle to assist in lowering the plant into its planting hole.

Applicant's device forms a permanent installation with the supply conduit 28 extending upwardly of the surface of the earth for receiving water or liquid food to pass the same into the passage 23 of the annular ring 22 and through this passage into the passages 26 and then outwardly of the apertures 27 into the earth about the root portion of the plant. Thus there is no waste of water or liquid feed used as it is applied directly to the feeding system of the plant which is its root system.

Applicant's device will not restrict the root system growth, as of a tree, as three is ample room between the tubular members 25 for the roots to extend outwardly. Thus applicant's device makes it very feasible to efficiently provide specific plants with whatever individual food requirements they may have for their own particular growth or development.

Modification

With reference to FIG. 5, a modification in connection with applicant's device comprises a hand holding support member whereby the device having a balled plant retained therein may readily be lowered into a planting hole.

Said holding member may be variously formed, such as of rigid strap material having a hand grip. As here indicated, said hand holding member comprises a flexible strap 32, such as a web strap, having a portion 32a looped about the base ring 20 and having secured at its upper free end a hand holding member or handle 33. Said strap 32 is relatively inexpensive and may be left buried in the earth as the planting hole is filled with earth.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:
1. A plant root watering device having in combination,
   a ring-like member,
   a second ring-like member in tubular form spaced vertically from said first ring-like member and being concentric therewith,
   a plurality of elongated tubular members connecting said first and second ring-like members,
   the passages in said tubular members having communication with the passage in said tubular ring-like member,
   said tubular members having perforations along their inner sides, and
   a supply conduit connected to said tubular ring-like member.
2. A plant root watering device having in combination,
   a ring-like member of relatively small diameter,
   a second tubular ring-like member of substantially greater diameter than said first member and concentric therewith,
   a plurality of elongated tubular members spaced circumferentially of said first and second ring-like members and connecting the same to provide for an axial separation of said ring-like members,
   said tubular members having their respective passages communicating with the passage in said tubular ring-like member,
   said tubular members having apertures along their inner sides, and
   a supply conduit connected to said tubular ring-like member.
3. A plant root watering device having in combination,
   a member substantially semi-spherical in form comprising
   a base member of relatively small transverse dimension,
   an annular tubular member of relatively large diameter spaced axially of said base member,
   a plurality of tubular members spaced circumferentially of said annular tubular member and connecting the same to said base member, said tubular members having their respective passages communicating with the passage in said annular tubular member,
   said tubular members having perforations spaced along their inwardly facing sides, and
   a supply conduit connected to said annular tubular member.
4. The structure set forth in claim 3,
   a strap member secured to said base member and having a handle at its free end.

References Cited in the file of this patent

UNITED STATES PATENTS

| | | |
|---|---|---|
| 209,798 | Conway | Nov. 12, 1878 |
| 357,197 | Harsin | Feb. 8, 1887 |
| 584,886 | Mead | June 22, 1897 |
| 1,785,430 | Agnell | Dec. 16, 1930 |

FOREIGN PATENTS

| | | |
|---|---|---|
| 212,721 | Germany | Aug. 6, 1909 |
| 457,083 | Great Britain | Nov. 20, 1936 |